United States Patent Office 3,030,347
Patented Apr. 17, 1962

3,030,347
DIALKYLPHOSPHONOALKYL ACRYLATE AND METHACRYLATE COPOLYMERS
Joseph L. O'Brien, Elkins Park, and Constance A. Lane, Philadelphia, Pa., assignors to Rohm & Haas Company, Philadelphia, Pa., a corporation of Delaware
No Drawing. Filed Apr. 25, 1960, Ser. No. 24,253
5 Claims. (Cl. 260—86.1)

This invention relates to new and valuable polymers derived from dialkylphosphonoalkyl acrylates and methacrylates. More particularly, this invention relates to homopolymers of dialkylphosphonoalkyl acrylates and methacrylates and to their copolymers with other copolymerizable vinylidene compounds. The present invention is especially concerned with copolymers of dialkylphosphonoalkyl acrylates and methacrylates with alkyl acrylates and methacrylates.

This application is a continuation-in-part of our application Serial No. 702,250 filed December 12, 1957, which on April 26, 1960, has issued as United States Patent No. 2,934,555.

In accordance with our invention, polymers and copolymers are prepared from compounds having the general formula

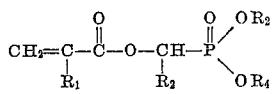

wherein $R_1$ is a hydrogen atom or a methyl group, $R_2$ is a hydrogen atom or an alkyl group having one to three carbon atoms, and $R_3$ and $R_4$ each represent an alkyl group having one to four carbon atoms.

Typical of compounds from which polymers and copolymers within the scope of the present invention are prepared are those represented by the following structural formulas and names:

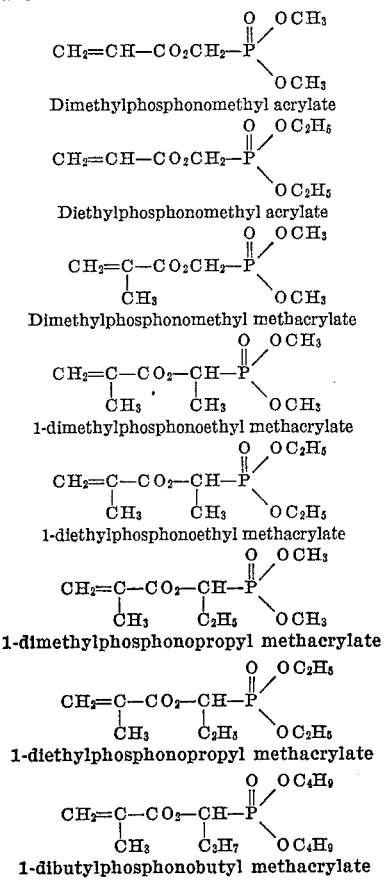

Dimethylphosphonomethyl acrylate

Diethylphosphonomethyl acrylate

Dimethylphosphonomethyl methacrylate 1-dimethylphosphonoethyl methacrylate 1-diethylphosphonoethyl methacrylate 1-dimethylphosphonopropyl methacrylate 1-diethylphosphonopropyl methacrylate 1-dibutylphosphonobutyl methacrylate Such compounds may be prepared by the addition of a dialkyl hydrogen phosphite to an aldehyde to form the dialkyl 1-hydroxyalkylphosphonate, followed by reaction of the latter intermediate with acrylyl or methacrylyl chloride in the presence of a hydrogen chloride acceptor such as pyridine or sodium carbonate. The synthetic procedure is illustrated by the following equations:

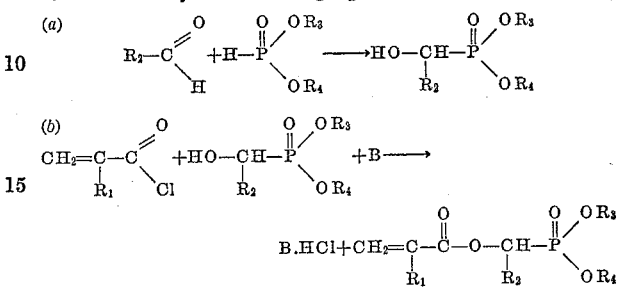

The phosphorus-containing monomers described above can be polymerized alone or can be copolymerized with one or more other vinylidene compounds to form copolymers. Examples of such monomers which can be copolymerized with the described organophosphorus monomers include methyl acrylate, methyl methacrylate, ethyl acrylate, butyl methacrylate, lauryl methacrylate, methacrylic acid, acrylonitrile, styrene, vinyl acetate, vinylidene chloride and the like.

The processes of polymerization which can be employed in the preparation of either homopolymers or copolymers include polymerization in bulk, in solution, in suspension, or in emulsion. The particular method to be employed will be governed by the nature of the copolymerizable monomer used, as well as by the form in which it is desired to obtain the copolymer product. The various methods which may be employed are well known in the art.

Certain of the polymers and copolymers of this invention are particularly useful as flame-resistant plastics. These include those copolymers which contain a preponderance of methyl methacrylate. Especially useful for this purpose are copolyemers of the dialkylphosphonoalkyl methacrylates with methyl methacrylate and methacrylic acid. Plastics with excellent flame-resistance are also formed by copolymerization of the monomers of this invention with methyl methacrylate and halogen-containing monomers, such as trichloroethyl methacrylate, bromoethyl methacrylate, 2,3-dibromopropyl methacrylate and the like.

Oil-soluble copolymers of the dialkylphosphonoalkyl acrylates and methacrylates with higher alkyl methacrylates are particularly useful as additives for lubricating oil compositions, to which they impart a number of valuable properties, i.e., pour point depressant, viscosity index improving and wear-resistance properties.

Other applications for the polymers and copolymers of this invention are, for example, in coatings, leather finishes, and textile finishes.

The following examples are illustrative of this invention:

EXAMPLE 1

*Dimethylphosphonomethyl Methacrylate*

A mixture of 66 grams (2 moles) of 90% paraformaldehyde and 220 grams (2 moles) of dimethyl hydrogen phosphite was heated with stirring to 80–90° C. for two hours, resulting in a quantitative yield of crude dimethyl hydroxymethylphosphonate. To a solution of 70 grams of crude dimethyl hydroxymethylphosphonate, 200 ml. anhydrous benzene and 63 grams of anhydrous sodium carbonate, there was added 53 grams of methacrylyl chloride at 25;35° C. over a period of 40 minutes. Stirring was continued for 24 hours at 25–35° C. and the temperature finally raised to 50° C. for one hour. The reaction mixture was filtered and the benzene removed under reduced pressure in the presence of 2.0 grams of N,N' - di - 2(1,4-naphthoquinonyl)-p-phenylenediamine. Dimethylphosphonomethyl methacrylate (13.7% yield) distilled at 80–5° C./0.04 mm., $n_D^{25}$ 1.4347, 14.0% P (theo. 14.9% P).

EXAMPLE 2

*Diethylphosphonomethyl Methacrylate*

A mixture of 84 grams (0.5 mole) of diethyl hydroxymethylphosphonate (from paraformaldehyde and diethyl hydrogen phosphite, B.P. 112–23° C./0.5 mm., 17.6% P (theo. 18.5%) $n_D^{25}$ 1.4250), 200 ml. of dry benzene and 44 grams (0.55 mole) of anhydrous pyridine was placed in a one-liter 3-neck flask aquipped with a stirrer, thermometer, addition funnel, condenser and drying tube. Methacrylyl chloride, 53 grams (0.5 mole), was added over a period of 30 minutes while the temperature was held at 0.5° C. by application of an ice-water bath. The reaction mixture was held at 0–5° C. for one hour and then allowed to stand at room temperature, 25–35° C., for 24 hours. The benzene solution was decanted from the rather sticky solid, which was dissolved in water, saturated with sodium chloride and resultant aqueous solution extracted twice with benzene. After drying the combined benzene extracts over magnesium sulfate, the benzene was removed under reduced pressure in the presence of 2.0 grams of N,N'-di-2(1,4-naphthoquinonyl)-p-phenylenediamine. Diethylphosphonomethyl methacrylate, 72 grams (61% yield) distilled at 87–102° C./0.05 mm., $n_D^{25}$ 1.4383, 13.9% P (theo. 13.12% P), sap. No. 468 (theo. 475).

EXAMPLE 3

*1-Dimethylphosphonoethyl Methacrylate*

To a mixture of 220 grams (2 moles) of dimethyl hydrogen phosphite and 95 grams (2.16 moles) of acetaldehyde, there was added 0.5 gram of sodium. A strong exotherm occurred and the temperature was maintained at 30–40° C. by application of an ice-water bath. The reaction mixture was then allowed to stand at room temperature, 25–35° C. for 24 hours, resulting in a quantitative yield of crude dimethyl 1-hydroxyethylphosphonate. To a solution of 77 grams (0.5 mole) of crude dimethyl 1-hydroxyethylphosphonate, 53 grams (0.5 mole) of sodium carbonate and 200 ml. of anhydrous benzene, there was added 53 grams (0.5 mole) of methacrylyl chloride at 25–35° C. over a period of 40 minutes. After stirring at 25–35° C. for 24 hours, the reaction mixture was heated to 50° C. for one hour, cooled and filtered. The benzene was removed under reduced pressure in the presence of 1.5 grams of N,N'-di-2(1,4-naphthoquinonyl)-p-phenylenediamine and 78 grams, 70% yield, of 1-dimethylphosphonoethyl methacrylate distilled at 78–84° C./.07 mm., $n_D^{25}$ 1.4419, 13.74% P (theo. 13.96%).

EXAMPLE 4

*1-Diethylphosphonoethyl Methacrylate*

To a mixture of 276 grams of diethyl hydrogen phosphite and 95 grams of acetaldehyde, there was added 0.5 grams of sodium. The temperature was maintained at 30–40° C. by application of an ice-water bath. After stirring at 25–35° C. for 24 hours, there was obtained a quantitative yield of crude diethyl 1-hydroxyethylphosphonate. To a solution of 182 grams (1 mole) of crude diethyl 1-hydroxyethylphosphonate, 106 grams (1 mole) of anhydrous sodium carbonate and 400 ml. of dry benzene, there was added 106 grams (1 mole) of methacrylyl chloride at 25–35° C. over a period of 40 minutes. After stirring for four hours at 30° C. the solution became very thick and an additional 100 ml. of dry benzene was added. After standing at 25–35° C. for 24 hours, the reaction mixture was filtered and the benzene removed under reduced pressure in the presence of 2.5 grams of N,N'-di-2(1,4-naphthoquinonyl)-p-phenylenediamine. Distillation gave 105 grams (42% yield) of 1-diethylphosphonoethyl methacrylate, B.P. 70–90° C./.02 mm., $n_D^{25}$ 1.4365, 11.9% P (theo. 12.4%).

EXAMPLE 5

*1-Dimethylphosphonopropyl Methacrylate*

Addition of a small piece of sodium to a mixture of 58 grams (1 mole) of propion aldehyde and 110 grams of dimethyl hydrogen phosphite caused the temperature to rise to 85° C. External heat was then applied and the temperature held at 100° C. for two hours. Distillation gave a 74% yield of dimethyl 1-hydroxypropylphosphonate, B.P. 111–113° C./0.5 mm., $n_D^{25}$ 1.4395, 19.1% P (theo. 18.5% P), 36.10% C (theo. 35.71% C), 8.00% H (theo. 7.47% H).

To a solution of 84 grams (0.5 mole) of dimethyl 1-hydroxypropylphosphonate, 40 grams of pyridine and 300 ml. of dry benzene, there was added 53 grams (0.5 mole) of methacrylyl chloride at 25–35° C. over a period of 30 minutes. After stirring at 28° C. for three hours, the reaction mixture was allowed to stand at room temperature overnight. The benzene solution was decanted from the sticky solid, which was then dissolved in water and the aqueous solution saturated with sodium chloride and extracted with benzene. The benzene was removed from the combined extracts, after drying over magnesium sulfate, under reduced pressure in the presence of 2.0 grams of N,N'-di-2(1,4-naphthoquinonyl)-p-phenylenediamine. Distillation of the residue gave a 22% yield of 1-dimethylphosphonopropyl methacrylate, B.P. 88–100° C./0.06 mm., $n_D^{25}$ 1.4423, 12.2% P (theo. 13.2% P).

EXAMPLE 6

*1-Diethylphosphonopropyl Methacrylate*

Sodium, 0.5 gram, was added to a mixture of 120 grams of propionaldehyde and 276 grams of diethyl hydrogen phosphite and the temperature held at 30–40° C. by application of an ice-water bath. After standing at 25–35° C. for 72 hours, a quantitative yield of crude diethyl 1-hdroxypropylphosphonate was obtained.

To a solution of 98 grams of crude diethyl 1-hydroxypropylphosphonate, 53 grams of sodium carbonate and 200 ml. of benzene, there was added 53 grams of methacrylyl chloride at 30–35° C. over a period of 40 minutes. After stirring at 25–35° C. for 24 hours, the reaction mixture was heated to 50–55° C. for one hour. A 35% yield of 1-diethylphosphonopropyl methacrylate distilled at 88–100° C./0.01 mm., $n_D^{25}$ 1.4365, 12.0% P (theo. 11.75% P).

EXAMPLE 7

*Dimethylphosphonomethyl Acrylate*

To a mixture of 140 grams (1.0 mole) of dimethyl hydroxymethylphosphonate and 106 grams (1.0 mole) of sodium carbonate in 400 ml. of dry benzene, there was added 90.5 grams (1.0 mole) of acrylyl chloride at 25–30° C. After stirring the reaction mixture at room temperature for 24 hours, the insoluble salts were removed by filtration. After removing the benzene under reduced pressure in the presence of 0.5 gram of hydroquinone, there was obtained 175 grams (90% yield) of a yellow oil, which was identified as dimethylphosphonomethyl acrylate.

In a similar manner, reaction of acrylyl chloride with dimethyl 1-hydroxyethylphosphonate gave 1-dimethylphosphonoethyl acrylate.

EXAMPLE 8

*Homopolymer of 1-Dimethylphosphonoethyl Methacrylate*

Twenty grams of 1-dimethylphosphonoethyl methacrylate and 0.01 gram of 2,2'-azobisisobutyronitrile were mixed well and placed in a small glass vial immersed in an oil bath at 60° C. After 48 hours, the vial was removed and its contents found to consist of a clear, hard, flame-resistant plastic.

EXAMPLE 9

*Copolymer of 1-Dimethylphosphonoethyl Methacrylate and Methyl Methacrylate*

Following the procedure of Example 8, a copolymer was prepared from 8.0 grams of 1-dimethylphosphonoethyl methacrylate and 12.0 grams of methyl methacrylate, using 0.02 gram of 2,2'-azobisisobutyronitrile. There was obtained a clear, hard, flame-resistant copolymer having a Barcol hardness of 30.

EXAMPLE 10

*Copolymer of 1-Diethylphosphonoethyl Methacrylate, Methyl Methacrylate, and Methacrylic Acid*

Following the procedure of Example 8, a copolymer was prepared from 6.0 grams of 1-diethylphosphonoethyl methacrylate, 12.0 grams of methyl methacrylate and 2.0 grams of methacrylic acid, using 0.01 gram of 2,2'-azobisisobutyronitrile. There was obtained a clear, hard, flame-resistant copolymer having a Barcol hardness of 32.

EXAMPLE 11

*Copolymer of 1-Dimethylphosphonoethyl Methacrylate, Methyl Methacrylate, and 2-Bromoethyl Methacrylate*

Following the procedure of Example 8, a copolymer was prepared from 6.0 grams of 1-dimethylphosphonoethyl methacrylate, 12.0 grams of methyl methacrylate and 2.0 grams of 2-bromoethyl methacrylate, using 0.02 gram of 2,2'-azobisisobutyronitrile. There was obtained a clear, hard, flame-resistant copolymer having a Barcol hardness of 38.

When 2.0 grams of 2,3-dibromopropyl methacrylate was used instead of the 2-bromoethyl methacrylate, the resulting polymer had a Barcol hardness of 35.

EXAMPLE 12

*Copolymer of 1-Diethylphosphonoethyl Methacrylate and Lauryl-Myristyl Methacrylate*

A 500 cc. round bottom 3-neck flask was fitted with a semi-circular glass stirrer, thermometer, dropping funnel, reflux condenser and a gas inlet tube. Nitrogen was passed through the flask and heating was provided by an electrically heated oil bath.

A monomer mixture was made up using the following:

41.1 grams of lauryl-myristyl methacrylate (the methacrylic ester of a mixture of alcohols comprising about 73% of lauryl alcohol and about 27% of myristyl alcohol; 97.5% pure by saponification number)
10.0 grams of diethylphosphonoethyl methacrylate
2.5 grams of toluene
0.125 gram of diisopropylbenzene hydroperoxide (50% solution)

There was charged to the flask at room temperature 13.4 grams of the above monomer mixture and 0.025 gram of butanol containing 0.006 gram of diisobutyl phenoxyethoxyethyl benzyl dimethyl ammonium chloride monohydrate (Hyamine 1622). The batch was heated immediately to a temperature of 117° C., when the remainder of the monomer mixture was added during the next 100 minutes at a rate of about 0.4 gram per minute. Forty minutes after the addition of the monomer mixture was complete, additional catalysts and solvent were added at regular intervals. The total heating time was 6 hours and 30 minutes. The total amounts of catalysts employed, based on the combined weight of the monomers, were 0.42% of diisopropylbenzene hydroperoxide and 0.042% of Hyamine 1622. The resulting toluene solution analyzed for 28.8% of copolymer, which represents a yield of 81.7%. The toluene solution of copolymer had a viscosity of 164 centistokes at 100° F.

Blends of the above copolymer solution with a base oil (a 170 solvent extract Mid-Continent neutral) were made up to contain from 1% to 4% of the copolymer. The resulting lubricant compositions were evaluated as antiwear agents in the Shell four-ball wear tester with the following results:

Conditions:
Speed _____ r.p.m__ 600
Temperature _____ ° C__ 75
Time _____ hours__ 1
Load _____ kg__ 40

| Percent copolymer in lubricant composition: | Scar diameter, mm. |
|---|---|
| Base oil | 0.83 |
| 1.0 | 0.51 |
| 2.0 | 0.44 |
| 4.0 | 0.47 |

We claim:

1. A copolymer of (1) a compound having the general formula $$CH_2=C-C-O-C-P\begin{matrix}O\\\|\end{matrix}\begin{matrix}H\\|\\R_2\end{matrix}\begin{matrix}O\\\|\end{matrix}\begin{matrix}OR_3\\/\\\backslash OR_4\end{matrix}$$

$$\begin{matrix}|\\R_1\end{matrix}$$

wherein $R_1$ is a member of the class consisting of hydrogen and methyl, $R_2$ is a member of the class consisting of hydrogen and alkyl groups having one to three carbon atoms, and $R_3$ and $R_4$ each is a member of the class consisting of alkyl groups of not over four carbon atoms, and (2) at least one other polymerizable monovinylidene compound.

2. A copolymer as defined in claim 1 wherein the second component is methyl methacrylate.

3. A copolymer as defined in claim 1 wherein the second component is lauryl-myristyl methacrylate.

4. A copolymer of 1-diethylphosphonoethyl methacrylate and methyl methacrylate.

5. A copolymer of 1-diethylphosphonoethyl methacrylate and lauryl-myristyl methacrylate.

References Cited in the file of this patent

UNITED STATES PATENTS 2,934,555   O'Brien et al. _____ Apr. 26, 1960